United States Patent
Kritzer et al.

(10) Patent No.: US 8,962,127 B2
(45) Date of Patent: Feb. 24, 2015

(54) ULTRATHIN, POROUS AND MECHANICALLY STABLE NONWOVEN FABRIC AND METHOD FOR MANUFACTURING

(75) Inventors: Peter Kritzer, Forst (DE); Raoul Farer, Essen (DE); Guenter Frey, Schliengen (DE); Michael Appelgruen, Voerstetten (DE); Rolf-Peter Schwoebel, Waldmichelbach (DE)

(73) Assignee: Carl Freudenberg KG, Weinheim (DE)

( * ) Notice: Subject to any disclaimer, the term of this patent is extended or adjusted under 35 U.S.C. 154(b) by 748 days.

(21) Appl. No.: 10/893,393

(22) Filed: Jul. 16, 2004

(65) Prior Publication Data

US 2005/0032451 A1    Feb. 10, 2005

(30) Foreign Application Priority Data

Aug. 6, 2003  (DE) .................................. 103 36 380

(51) Int. Cl.
*A61F 13/15*   (2006.01)
*B32B 27/32*   (2006.01)
*D04H 1/00*    (2006.01)

(52) U.S. Cl.
USPC ........... 428/219; 428/220; 442/327; 442/400; 442/414

(58) Field of Classification Search
USPC .......... 442/327, 361–364, 414, 400, 401, 415
See application file for complete search history.

(56) References Cited

U.S. PATENT DOCUMENTS

| | | | |
|---|---|---|---|
| 5,401,594 A | 3/1995 | Schwobel et al. | 429/142 |
| 5,500,167 A | 3/1996 | Degen | 264/41 |
| 5,888,916 A | 3/1999 | Tadokoro et al. | 442/334 |
| 5,935,884 A * | 8/1999 | Williams et al. | 442/364 |
| 6,277,282 B1 | 8/2001 | Kihara et al. | 210/652 |
| 6,447,958 B1 | 9/2002 | Shinohara et al. | 429/248 |
| 6,473,950 B1 | 11/2002 | Kumakawa | 29/25.42 |
| 6,730,440 B1 | 5/2004 | Bauer et al. | 429/249 |
| 7,807,286 B2 * | 10/2010 | Hennige et al. | 429/129 |
| 2002/0045091 A1 | 4/2002 | Kamei et al. | 429/62 |

(Continued)

FOREIGN PATENT DOCUMENTS

DE    76 09 323     10/1976
DE    25 47 958     5/1977

(Continued)

OTHER PUBLICATIONS

D1: Encyclopedia: Lehrbuch der Papier- and Kartonerzeugung, Autorenkollektiv, Nachdruck der 2. Auflage von 1986, Leipzig, Fachbuchverlag 1989, ISBN 3-343-00138-4, p. 358 (see translation).

(Continued)

*Primary Examiner* — Lynda Salvatore
(74) *Attorney, Agent, or Firm* — Pearl Cohen Zedek Latzer Baratz LLP

(57) ABSTRACT

An ultrathin, porous, and mechanically stable nonwoven fabric, a method for manufacturing the fabric, and the fabric's use are described. A nonwoven fabric is described having a thickness of less than 30 μm, which is chemically and/or thermally bonded, whose maximum tensile load in at least one direction is at least 15 N/5 cm, whose stretching in this direction at maximum tensile load is 35% at the most, and which has a porosity of at least 25%. This nonwoven fabric may be used as a separator material or as a carrier material for diaphragms.

10 Claims, 2 Drawing Sheets

101 — Manufacturing a non-woven fabric and calendaring the nonwoven fabric to bind the nonwoven fabric and reduce its thickness 102 — Reinforcing the nonwoven fabric using binding fibers, melting adhesives, and/or chemical binding agents

(56) References Cited

U.S. PATENT DOCUMENTS

| | | | |
|---|---|---|---|
| 2002/0090876 A1* | 7/2002 | Takase et al. | 442/363 |
| 2003/0082980 A1* | 5/2003 | Plotz | 442/364 |
| 2003/0087982 A1 | 5/2003 | Kanazawa | 522/49 |
| 2003/0180622 A1 | 9/2003 | Tsukuda et al. | 429/249 |

FOREIGN PATENT DOCUMENTS

| | | |
|---|---|---|
| DE | 199 18 856 A1 | 11/1999 |
| DE | 198 55 889 | 6/2000 |
| DE | 199 16 043 | 10/2000 |
| DE | 199 16 109 | 10/2000 |
| DE | 101 96 273 T1 | 9/2003 |
| EP | 0 603 500 A1 | 6/1994 |
| EP | 0 795 916 A1 | 9/1997 |
| EP | 0 811 479 | 12/1997 |
| EP | 0 834 936 A1 | 4/1998 |
| EP | 0 436 001 B1 | 6/1998 |
| EP | 0 662 250 | 2/2001 |
| JP | 11/176 419 | 7/1999 |
| JP | A11-181664 | 7/1999 |
| JP | 2000/195 494 | 7/2000 |
| JP | A2002-110132 | 4/2002 |
| JP | A2003-105660 | 4/2003 |
| JP | A2003-45752 | 9/2004 |
| WO | WO 93/13 565 | 7/1993 |
| WO | WO 99/31 743 | 6/1999 |
| WO | WO 00/33406 | 6/2000 |
| WO | WO 00/77 875 | 12/2000 |

OTHER PUBLICATIONS

D2: Datasheet of Hirose Paper mfg. Co. Ltd. with type reference # 0132TH-8.
D2.1-D2.8: Documents for prior public use (cited during opposition procedure of the parallel German patent DE 103 36 380).
D6a: Calculation of tensile strength.
D6b: Table of tensile strength.
D9: Extract of „Vliesstoffe, 1982, Georg Thieme Verlag Stuttgart, p. 349 (see translation).
D10: Extract of „Vliesstoffe, 2000, VCH, pp. 599, 600, 669-671 (see translation).

* cited by examiner

| Example No. | Manufacturing Technology | Polymer | Mass per Unit Area (g/m²) | Thickness (μm) | Maximum Tensile Load, longitudinal (N / 5 cm) | Stretching (extension) at Maximum Tensile Load (%) | Mean Pore Diameter | Maximum Pore Diameter | Porosity (%) |
|---|---|---|---|---|---|---|---|---|---|
| 1 | Wet-laid | PO | 13 | 20 | 45 | 25 | 70 | 90 | 45 |
| 2 | Wet-laid | PES | 12 | 20 | 30 | 12 | 50 | 65 | 57 |
| 3 | Wet-laid | PES | 10 | 16 | 28 | 10 | 38 | 61 | 55 |
| 4 | Wet-laid | PES | 8 | 12 | 25 | 10 | 42 | 67 | 52 |
| 5 | Wet-laid | PAN + Acrylic | 12 | 20 | 27 | 12 | 13 | 20 | 48 |
| 6 | Wet-laid | PAN + Acrylic | 10 | 18 | 20 | 14 | 43 | 65 | 52 |
| 7 | Dry-laid | PES | 15 | 19 | 50 | 24 | 90 | 180 | 44 |
| 8 | Dry-laid | PA | 15 | 18 | 26 | 27 | 160 | 260 | 27 |
| CE 1 | Spunbonded | PES | 14 | 20 | 12 | 78 | 200 | 400 | 50 |
| 9 | Spunbonded | PP + CoPP | 8 | 18 | 22 | 27 | 190 | 350 | 51 |
| 10 | Melt-blown | PP | 12 | 20 | 22 | 15 | 10 | 15 | 34 |
| CE 2 | Mesh | PES | 14 | 28 | 45 | 38 | 1600 | 2000 | 64 |
| CE 3 | Mesh | PP | 16 | 30 | 75 | 85 | 1200 | 1400 | 41 |
| CE 4 | Mesh | PP | 10 | 20 | 24 | 150 | 650 | 900 | 45 |

Fig. 2

ULTRATHIN, POROUS AND MECHANICALLY STABLE NONWOVEN FABRIC AND METHOD FOR MANUFACTURING

Priority is claimed to German Patent Application No. DE103 36 380.7, filed on Aug. 6, 2003, the entire disclosure of which is incorporated by reference herein

BACKGROUND

The present invention relates to ultrathin, porous, and at the same time mechanically stable nonwoven fabrics, their manufacture, and their use as, for example, separators for electrochemical cells such as accumulators, batteries, or fuel cells, as well as for electrical energy storage such as super-capacitors.

Electrochemical cells must have separators which separate the two differently charged electrodes within the cell, thereby preventing an internal short-circuit. A series of demands are made on separator materials which may be summarized as follows:
1. Resistance to the electrolyte
2. Resistance to oxidation
3. High mechanical stability
4. Low weight tolerance and thickness tolerance
5. Low ion passage resistance
6. High electron passage resistance
7. Ability to retain solid particles detached from the electrodes
8. Instant spontaneous wettability by the electrolyte
9. Permanent wettability by the electrolyte, and
10. High storage capacity for the electrolyte fluid.

Textile fabrics, in particular nonwoven fabrics made of synthetic fibers, are inherently well suited to be used as separator materials because of their good resistance to electrolyte fluids and at the same time their high flexibility.

Current material alternatives are papers which, however, have only a low porosity due to their high density and are therefore unsuitable for applications which require an open material. Other material alternatives are diaphragms which, however, are limited with respect to the polymers to be used and have, as a rule, only a low porosity of <25% and small pore diameters of <0.5 µm. So far, a thickness of <20 µm could not be achieved in the nonwoven products known per se. Nonwoven products having substantially reduced thicknesses and at the same time excellent mechanical properties as well as high porosity are desirable for many novel applications.

Such nonwoven fabrics may be used, for example, as separator support materials in lithium batteries, alkaline batteries, super-capacitors, or fuel cells, as well as as a carrier material for filter diaphragms.

The use of nonwoven fabrics as a carrier material or a support material for diaphragms is known. Fluid is pressed and filtered under high mechanical pressures through a diaphragm reinforced in this way.

The following demands are made on this support material:
Chemical resistance to the solution to be filtered
Sufficient mechanical stability
"Compatibility," i.e., good adhesive properties of the base material with the diaphragm polymer which is applied for the most part using the extrusion method
Extremely smooth surface so that no projecting fiber is able to perforate the diaphragm.

The properties for these supported materials are weighted as follows:
stability>>homogeneity=thickness>structure The mechanical stability of the support materials is of utmost importance. Typical values for the maximum tensile load are in the range of >>200 N/5 cm. This yields thicknesses and masses per unit area of >200 µm and >60 g/m$^2$, respectively, when conventional materials are used.

Since diaphragms used in such systems have very small pore diameters (as a rule <<1 µm) and low porosity, the presence of high porosity and a uniform pore-size distribution in the support material is secondary. Therefore, coarse fibers (titer >1.5 dtex) are used as a rule in such materials. The presence of a labyrinth-like structure and a small thickness in these materials is not absolutely essential for this application.

If nonwoven fabrics are to be used as carrier materials for separators, for example, in lithium batteries, alkaline batteries, and fuel cells, they must meet the criteria mentioned above.

The chemical properties are to be selected in such a way that there is a) chemical resistance to the electrolyte (organic media in the case of Li cells, highly acidic aqueous solutions in the case of fuel cells, highly alkaline solutions in the case of alkaline batteries) at long-term temperatures typically of up to 70° C. and resistance to oxidation, and that b) no or at least only minor mechanical swelling of the separator takes place in the event of contact with the electrolyte.

In addition, the properties which are determined by the morphology/geometry of the material are to be selected in such a way that there is/are:

a) a small thickness of <30 µm, preferably <20 µm (the ion passage resistance of the separator is a linear function of the thickness);

b) high porosity and at the same time homogeneous pore distribution (the porosity directly affects the ion passage resistance; the porosity of such a material should therefore amount to >25%, preferably >45%, and, to ensure a uniform pore distribution, the maximum pore size should be at the most 2.5 times that of the most likely pore size);

c) a small pore size, so that dendrites in batteries cannot become intermixed (however, when nonwoven fabric is used as a support material, this issue plays a subordinate role, since, as a rule, the gel/compound introduced assumes this task; for both applications, however, a maximum pore size of typically 500 µm should be observed);

d) sufficiently large pore sizes which make the introduction of a compound or gel possible (the minimum mean pore sizes should not exceed 0.5 µm);

e) a sufficiently high mechanical stability for the assembly of the cells (in practice, maximum tensile load values of at least 15 N/5 cm have been found to be suitable for industrial processing);

f) minor stretching of the material when mechanical stress is applied (excessive stretching values may result in material distortion); it has been shown in practice that stretching values under maximum tensile load should not exceed 35%; and that g) simple manufacture of the separator is possible.

In applications other than the above-mentioned applications as a carrier material or as a support material for diaphragms, the weighting of the properties is as follows:
thickness>>porosity=homogeneity=structure=mechanical stability It is generally possible to achieve nonwoven fabrics having thicknesses of <30 µm by calendering materials of different types. It should be pointed out, however, that a polyolefin fiber having a fiber titer of 2 dtex, which is used as a standard material in separator applications, already has a fiber diameter of approximately 17 μm itself, which means that a 50 μm thick material may only be composed of a maximum of three layers of such a fiber. Calendering of a comparatively heavy material, with respect to the mass per unit area, may yield a thin material, the resulting material, however, being so dense in this case that it would result in a high ion passage resistance.

Therefore, if sufficiently high mechanical stability, high homogeneity, as well as narrow pore distribution are required in addition to the small thickness, the use of meshes (materials are too coarse-fibered and the pores thus too large) and the use of papers (materials are too dense) are preferred to a lesser extent.

The separators in Li-ion accumulators are, as a rule, microporous diaphragms, mostly made of polyolefins. The porosities are comparatively low and are in the region of <25%. Hence, the resulting electric resistance is high. They do not have any explicit ionic conductivity. Microporous polyolefin diaphragms which have been laminated at least on one surface using a nonwoven fabric made of polyolefin fibers and their use as separators are described in European Patent Application No. 0 811 479. According to the description, the polyolefin nonwoven has a thickness of 30 μm to 500 μm prior to laminating.

U.S. Pat. No. 5,500,167 describes a microporous diaphragm having a carrier for the filtration. A porous nonwoven fabric is used as a carrier. No details can be found about the thickness of the nonwoven fabrics used; however, fibers having a diameter of 20 μm to 25 μm are used for their manufacture. Thus, the resulting nonwoven fabrics have thicknesses which are considerably above 50 μm.

A diaphragm element for reversible osmosis, made of multiple layers, is known from U.S. Pat. No. 6,277,282. One of these layers may be made of a nonwoven fabric. According to the description, this layer has a thickness of 50 μm to 200 μm. Diaphragms made of ion-conductive polymers are presently used for Li-polymer accumulators (as described, for example, in DE-A-199 16 109; DE-A-199 16 043; DE-A-198 55 889, and European Patent Application No. 0 662,250 corresponding to WO-A-93/13, 565). During their manufacture, the components, dissolved or dispersed in an organic solvent, are applied to a film and the solvent is evaporated in a defined manner. This is followed in most cases by a thermal or UV-induced crosslinking process. The ion-conductive diaphragm manufactured in this way has a substantially lower resistance than the microporous diaphragms described above. As a rule, these diaphragms made of ion-conductive polymers are laminated onto the electrodes in a continuous step. The low mechanical stability of such thin diaphragms is particularly problematic. They may develop cracks or break completely during manufacturing. Irreparable damage to the future cell occurs in the first case; production must be stopped in the second case. A remedy is found in practice in that such diaphragms are initially deposited on a film which is subsequently removed. As a rule, the film is not reused. In addition to the waste material and the associated extra costs, problems may arise during the diaphragm's removal from the film; in this case also, breakage of the diaphragm cannot be ruled out.

A button cell battery is known from JP-A-2000-195,494 in which, among other things, a nonwoven separator may also be used. In addition to thermostable structure materials, this nonwoven fabric is made of a polymer which expands in contact with the electrolyte and absorbs it. No details are given about the thickness of these nonwoven fabrics.

JP-A-11/176,419 describes a secondary lithium cell which is made of a multi-layer electrode-separator system. The separator having a thickness of 20 μm to 200 μm is made of thermostable structure materials, in this case polyvinylidene fluoride (PVDF) or PVDF-HFP (hexafluoropropylene) mixtures. This document describes a good behavior at nonwoven fabric thicknesses between 50 μm and 100 μm. It was not possible to achieve thicknesses below 20 μm due to the nonwoven fabric's low breaking resistance.

WO-A-00/77,875 describes the simplification of the manufacturing process of a secondary lithium-polymer cell which is made of a multi-layer electrode-separator system. According to this document, thin electrode materials are fabricated which are deposited from an organic solution on a film made of polyolefin or polyester, on paper, or on a very heavily calendered, dense polyamide nonwoven. This "deposit" is used as a processing aid for the subsequent laminating ("strip casting") of the electrodes using binders. Details about geometrical dimensions of the deposit are not to be found in this document.

WO-A-99/31,743 describes the deposition of dispersed electrode layers on a separator surface. Details about geometrical dimensions of the deposit are not to be found in this document either.

Thin nonwoven fabrics and methods for their manufacture by separating bulky and bonded nonwovens into thin layers are described in DE-A-25 47 958. Nonwoven fabrics having masses per unit area down to below 20 g/m$^2$ are described. Although details about the thickness and the mechanical properties of these nonwoven fabrics are not to be found in this document, it concerns, however, a bulky and open starting material. The nonwoven fabrics made of that material thus do not have particularly good mechanical properties.

BRIEF SUMMARY OF THE INVENTION

An object of the present invention is to provide an ultrathin and simultaneously mechanically stable nonwoven fabric having a high porosity.

A further alternative or additional object of the present invention is to provide a nonwoven fabric having the properties defined above and a defined pore structure.

A further alternative or additional object of the present invention is to provide an ultrathin nonwoven fabric which is mechanically sufficiently stable to be processed without the use of auxiliary means such as carrier films, and which may be used as a separator material in electrochemical cells.

Still a further alternative or additional object of the present invention is to provide manufacturing methods for these new nonwoven fabrics.

The present invention relates to a nonwoven fabric having a thickness of less than or equal to 30 μm, preferably less than 20 μm, which is chemically and/or thermally bonded, whose maximum tensile load in at least one direction is at least 15 N/5 cm, preferably at least 20 N/5 cm, and whose maximum tensile load extension in this direction is 35% at the most, preferably 25% at the most, and which has a porosity of at least 25%, preferably at least 40%.

The nonwoven fabric according to the present invention is ultrathin. The required uniformity of the nonwoven fabric as well as sufficient mechanical stability may be achieved despite the small thickness by using selected wet fleece and dry fleece materials. The nonwoven fabric so manufactured may be used in a plurality of applications, particularly in electronic applications.

The nonwoven fabrics according to the present invention may be made of any types of fibers. The fibers making up the nonwoven fabric according to the present invention may be composed of the most different fiber-forming materials, in particular fiber-forming polymers. The fiber material must be durable for the intended applications.

Any fiber-forming materials may be used. Examples include polyacrylonitrile, carbon, glass, polyamides, in particular polyamide 6 and polyamide 6.6, preferably polyolefins, and particularly preferably polyester, in particular polyethylene terephthalate and polybutylene terephthalate.

The polyolefins are typically poly-alpha-olefins. They may be used in the form of homopolymers, such as polyethylene or in particular polypropylene, or as copolymers, such as a copolymer derived from propylene and butylene.

Examples of polyolefins are polypropylene, polyethylene, and olefin copolymers which are manufactured, for example, either with the aid of Ziegler-Natta catalysts or metallocene catalysts.

The fibers making up the nonwoven fabric according to the present invention may be cut staple fibers, short-cut fibers, or continuous filaments. They may be friezed if needed. Combinations of most different types of fibers are also possible.

Their diameter is typically less than 20 µm, preferably 0.5 µm to 18 µm, and particularly preferably 1 µm to 15 µm. Heterofibers, preferably heterofibers containing at least one polyolefin component, e.g., bicomponent fibers, may be used in addition to homofibers made, in particular, of thermoplastic polymers.

Irrespective of whether homofibers or multicomponent fibers are used, the cross section of the fibers may be round, oval, ribbed on the surface, ribbon-shaped, trilobal, or multilobal.

The nonwoven fabrics according to the present invention may be formed using different deposition methods. Wet-laid nonwovens, carded staple fiber nonwovens, melt-blown nonwovens, and, when multicomponent fibers are used, spunbonded nonwovens may be used as layers.

The nonwoven fabrics according to the present invention typically have masses per unit area of 3 g/m² to 25 g/m².

Wet-laid nonwovens or staple fiber nonwovens are preferred in particular.

The fibers making up the nonwoven fabric according to the present invention are either mechanically or aerodynamically stretched. However, it is also conceivable to add fibers having either the same or a different polymer composition and which are only partially stretched or not at all stretched to the stretched fibers.

Particularly preferred are nonwoven fabrics which have been manufactured using spunbonded nonwoven technology and which contain at least, preferably exclusively, one bicomponent or multicomponent fiber.

Likewise preferred are nonwoven fabrics which have been manufactured using melt-blown technology.

Furthermore, nonwoven fabrics are preferred which contain fibers selected from the class made up of polyolefins, polyesters, polyacrylonitriles, polyamides, polyimides, polycarbonates, polysulfones, carbon, glass, as well as their mixtures.

If fibers made of such materials are used, in particular polyolefin fibers or polyester fibers, no swelling of the separator occurs in contact with the electrolyte. In cells which are not under mechanical stress or in cells having a flexible housing, such swelling would result in an undesirable increase in the separator thickness.

The nonwoven fabrics according to the present invention are reinforced using a thermal and/or a chemical bond. Thus, they are bonded using binding fibers, melting adhesives, and/ or chemical binding agents, and/or the fibers are in part mollified due to the nonwoven manufacturing or processing method thereby forming bonds among each other.

The nonwoven fabrics according to the present invention have a high porosity (P). Within the scope of this description this term is to be understood as follows:

$$P = (1 - FG/(d \cdot \rho)) \cdot 100$$

where FG indicates the mass per unit area in kg/m², d indicates the thickness in m, and p indicates the density in kg/m³.

The maximum pore diameter in the nonwoven fabric according to the present invention is typically 500 µm, in particular a maximum of 300 µm.

Nonwoven fabrics whose maximum pore diameter is at the most 2.5 times as large as the medium pore diameter are preferred.

Particularly preferred are nonwoven fabrics whose minimum medium pore diameter is larger than 0.5 µm, in particular larger than 1.0 µm.

The nonwoven fabrics according to the present invention normally have stretchings of 35% at the most under maximum tensile load in at least one direction.

The present invention also relates to a method for manufacturing the above-defined nonwoven fabrics including the steps:

i) Manufacturing a nonwoven fabric having a mass per unit area of up to 25 g/m², preferably 3 g/m² to 25 g/m², using wet-laid or dry-laid nonwoven forming methods known per se, and ii) Calendering the nonwoven fabric to bond it and to reduce its thickness.

Prior to calendering under heat and pressure, the fiber layer contained in step i) may be pre-bonded using known methods of nonwoven bonding; the bond may be on the entire surface or on a part thereof.

The method according to the present invention is based on the calendering of a nonwoven fabric.

The calendering process to achieve the ultrathin nonwoven fabric causes compacting of the precursor nonwoven and possibly autogenous welding of the fibers or fiber components which are melt-activated under the bonding conditions.

Calendering is carried out under heat and pressure.

In the case of the use of polyolefin fibers, calendering temperatures of typically 100° C. to 160° C. are used as a function of the particular olefin fiber or fiber component. The calender conditions must be adapted in particular to the melting and softening behavior of the polymers used in the individual case. When polyester is used, e.g., polyethylene terephthalate, the calendering temperatures are typically 170° C. to 230° C.

The calender is basically made up of two smooth rollers. One roller may also have an embossed pattern in individual cases where a structured surface is desired.

Autogenous welding is to be understood as the process of welding the fibers concerned or a portion of the fibers in the nonwoven fabric without adding an additional adhesive.

Preferred is a method where thermal bonding and calibration takes place in the webber (in-line), or in a separate step using a calender which is made up of a combination of two rollers which are made of the same material, preferably steel or comparable high-alloyed materials.

In a further preferred method, thermal bonding and calibration take place in the webber (in-line), or in a separate step using a calender which is made up of a combination of two rollers which are made of materials of different hardnesses, preferably steel or comparable high-alloyed materials and a thermally stable synthetic material.

In a further preferred variant of the method according to the present invention, the surface of the nonwoven fabric is permanently rendered hydrophilic, preferably with the help of gas-phase fluorination, plasma treatment, grafting of organic polar groups such as sulfonation, or the addition of hydrophilizing melt additives to the polymer melt.

The nonwoven fabrics according to the present invention may be used as separator material or as separator carrier material in electrochemical cells or energy accumulators, in particular in batteries, accumulators, capacitors, and/or fuel cells.

A further use relates to the utilization of the nonwoven fabric according to the present invention as carrier material for diaphragms for filter applications.

These uses are also objects of the present invention.

BRIEF DESCRIPTION OF THE DRAWINGS

FIG. 2 shows a comparison of the data of ultrathin nonwoven fabrics manufactured according to the different technologies used in the examples.

DETAILED DESCRIPTION OF THE PREFERRED EMBODIMENTS

Figure 1:
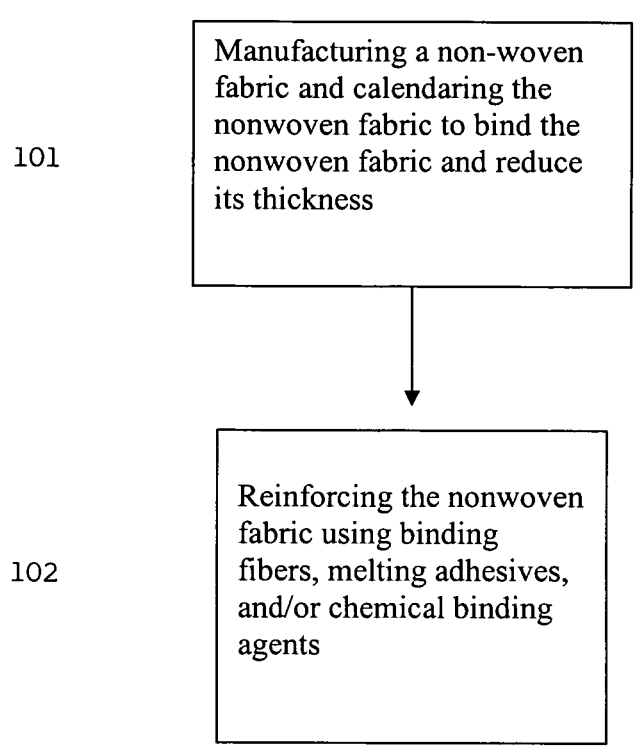
FIG. 1 shows a flowchart of a method according to the present invention.

FIG. 1 shows a flowchart of a method according to the present invention. In step 101, a nonwoven fabric is manufactured. In step 102, the nonwoven fabric is reinforced using binding fibers, melting adhesives, and/or chemical binding.

The following examples explain the present invention without limiting it.

APPLICATION EXAMPLES

The following nonwoven fabrics/meshes have been manufactured and used (see Table No.1):

Example 1

Wet-laid polyolefin nonwoven (PP (polypropylene) fiber and PP/PE (polypropylene/polyethylene) core/sheath fiber; titer of both fibers <1.0 dtex) having a mass per unit area of 15 g/m$^2$ and a thickness of 20 μm, thermally bonded and subsequently calendered at 120° C. and a line pressure of 50 N/mm.

Examples 2 through 4

Different thermally bonded polyester wet-laid nonwovens having different masses per unit area and different thicknesses (see also Table No.2) (stretched and unstretched polyester fibers; fiber titer <1.0 dtex and <1.5 dtex, respectively). Thickness calibration took place in-line after web laying or in a separate production step. In-line bonding took place using a calender having a steel-steel, steel-scappa, or steel-silicone roller combination at a temperature of 170° C. to 225° C. The materials are listed in Table No. 2. A portion of these materials was not calendered in-line, i.e., run "open," and was subsequently post-set in a further production step at temperatures of 170° C. to 220° C. These materials are listed in Table No. 3. The line pressures were in the range of 60 N/mm to 70 N/mm for all materials.

Examples 5 and 6

Wet-laid nonwovens made of polyacrylonitrile fibers (fiber titer <1.0 dtex) which were thermally fixed using an acrylic resin and subsequently calendered at 180° C. and a line pressure of 80 N/mm. For masses per unit area and thicknesses see Table No. 1.

Example 7

Thermally bonded and subsequently calendered polyester dry-laid nonwoven having a mass per unit area of 15 g/m$^2$ and a thickness of 19 μm (stretched and unstretched polyester fibers, fiber titer each <1.5 dtex, calendered at 225° C. and a line pressure of 80 N/mm).

Example 8

Thermally bonded and subsequently calendered polyamide dry-laid nonwoven (PA (polyamide) 66 and PA66/PA6 bicomponent fibers, fiber titer 1.0 dtex and 1.7 dtex, respectively) having a mass per unit area of 15 g/m$^2$ and a thickness of 18 μm, calendered at 230° C. and a line pressure of 80 N/mm.

Comparative Example 1

Spunbonded nonwoven made of polyester (fiber diameter approximately 8 μm), subsequently calendered at 215° C. and a line pressure of 80 N/mm (mass per unit area of 14 g/m$^2$ and a thickness of 20 μm).

Example 9

Spunbonded nonwoven made of a bicomponent polyolefin fiber (PP and co-PP; fiber diameter approximately 10 μm, equal to a titer of approximately 1.0), subsequently calendered at 135° C. and a line pressure of 70 N/mm (mass per unit area of 8 g/m$^2$ and a thickness of 18 μm).

Example 10

Spunbonded nonwoven made of PP, manufactured using melt-blown technology, having fiber diameters of 2 μm to 3 μm, subsequently calendered at a line pressure of 20 N/mm and a temperature of 130° C. (mass per unit area: 12 g/m$^2$; thickness: 20 μm).

Comparative Example 2

150 μm thick polyester mesh, subsequently calendered at 235° C. and a line pressure of 80 N/mm (mass per unit area of 14 g/m$^2$ and a thickness of 28 μm).

Comparative Example 3

180 μm thick polypropylene mesh having yarn sizes of approximately 50 μm, subsequently calendered at 135° C. and a line pressure of 50 N/mm (mass per unit area of 16 g/m$^2$ and a thickness of 30 μm).

Comparative Example 4

120 μm thick fine polypropylene mesh having yarn sizes of approximately 20 μm, subsequently calendered at 138° C. and a line pressure of 50 N/mm (mass per unit area of 10 g/m$^2$ and a thickness of 20 μm).

Determining the Mass per Unit Area:

The mass per unit area of the materials was determined according to EN 29073 Ti.

Determining the Thickness:

The thickness of the materials was determined according to EN 20534 (measuring pressure of the test die 10 kPa, applied to a test surface of 2 cm$^2$).

Determining Mechanical Stability:

The maximum tensile load of the materials was determined according to EN 29073 T3.

Determining the Pore Diameter:

The mean pore diameter and the maximum pore diameter ("bubble point") were determined according to the ASTM E 1294 standard (Coulter porometer).

The preceding application examples show that the manufacturing methods are superbly suited for manufacturing a material which meets the above-mentioned requirements:

- Wet-laid nonwoven using in-line or subsequent calendering
- Dry-laid nonwoven using in-line or subsequent calendering
- Spunbonded nonwoven, made of a bicomponent fiber and subsequently thermally bonded
- Melt-blown nonwoven which is subsequently calendered.

FIG. 2 shows a comparison of the data of ultrathin nonwoven fabrics manufactured according to the different technologies used in the examples.

What is claimed is:

1. A nonwoven fabric suitable as a carrier material for separators in lithium batteries or in super capacitors, the nonwoven fabric having
    a thickness of less than or equal to 30 µm,
    a maximum tensile load in at least one direction of at least 15 N/5 cm, and a maximum extension in the direction at the maximum tensile load being 35%,
    a porosity of at least 40% and a mass per unit area of from 3 g/m$^2$ to 25 g/m$^2$, and
    wherein the nonwoven fabric includes fibers having a melting point greater than 200° C. selected from the group consisting of polyethylene terephthalate and polybutylene terephthalate, and
    wherein the nonwoven fabric is reinforced using a chemically and/or thermally bonded material selected from binding fibers, melting adhesives, and chemical binding agents.

2. The nonwoven fabric as recited in claim 1 wherein its thickness is less than or equal to 20 µm.

3. The nonwoven fabric as recited in claim 1 wherein the nonwoven fabric is selected from the group consisting of a wet-laid nonwoven, a carded staple fiber nonwoven, a melt-blown nonwoven, and a spunbonded multi-component nonwoven.

4. The nonwoven fabric as recited in claim 1 wherein the nonwoven fabric has a maximum pore diameter of approximately 500 µm.

5. The nonwoven fabric as recited in claim 4 wherein the nonwoven fabric has a maximum pore diameter of approximately 300 µm.

6. The nonwoven fabric as recited in claim 1 wherein the maximum pore diameter of the fabric is at the most 2.5 times as large as the mean pore diameter of the fabric.

7. A separator material or a separator carrier material in electrochemical cells or energy accumulators, comprising a nonwoven fabric as recited in claim 1.

8. The separator material or separator carrier material as recited in claim 7 wherein the electrochemical or energy accumulators are batteries, accumulators, capacitors, and/or fuel cells.

9. A carrier material for diaphragms for filter applications comprising the nonwoven fabric as recited in claim 1.

10. The nonwoven fabric as recited in claim 1 wherein the thickness of less than or equal to 30 µm is achieved by calendering the nonwoven fabric.

* * * * *